(12) United States Patent　　(10) Patent No.: US 7,854,674 B2
Freudenreich　　(45) Date of Patent: Dec. 21, 2010

(54) DRIVE SYSTEM FOR THE INDIVIDUAL DRIVE OF BOTH DRIVEN WHEELS OF A DRIVEN WHEEL PAIR

(75) Inventor: Hans-Peter Freudenreich, Griesingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 437 days.

(21) Appl. No.: 12/067,540

(22) PCT Filed: Aug. 21, 2006

(86) PCT No.: PCT/EP2006/008218

§ 371 (c)(1),
(2), (4) Date: Apr. 28, 2008

(87) PCT Pub. No.: WO2007/033739

PCT Pub. Date: Mar. 29, 2007

(65) Prior Publication Data

US 2008/0202826 A1　Aug. 28, 2008

(30) Foreign Application Priority Data

Sep. 22, 2005　(DE) ........................ 10 2005 045 281

(51) Int. Cl.
*F16H 37/04* (2006.01)

(52) U.S. Cl. .................................. 475/5; 475/6; 475/9

(58) Field of Classification Search .................... 475/6, 475/8, 9, 150, 151, 21; 180/371, 372
See application file for complete search history.

(56) References Cited

U.S. PATENT DOCUMENTS 1,543,044 A　6/1925 Anglada
5,285,866 A　2/1994 Ackroyd

FOREIGN PATENT DOCUMENTS

DE　10 2005 010 51 A　9/2006
EP　0 498 340 A1　8/1992
EP　0 965 511 A2　12/1999
FR　1018160　12/1952

*Primary Examiner*—Edwin A Young
(74) *Attorney, Agent, or Firm*—Davis & Bujold, P.L.L.C.

(57) ABSTRACT

A drive system for individually driving two driven wheels of a vehicle. The system includes two continuously variable drive motors which are drivingly connected, via a transmission arrangement, with respective driven wheels. Each transmission arrangement includes a shift transmission and a bevel gear transmission, which has a fixed transmission ratio and includes a spur gearset and a bevel gearset. Shift transmissions vary the transmission ratio and the bevel gear transmission enables arranging drive shafts of the drive motors transversely to the rotational axis of the driven wheels. The spur gearsets enable vertical repositioning of the transmissions drive output shafts. Furthermore, with different arrangements of the bevel gears, inclination of respective drive motors and shift transmissions relative to the vehicles longitudinal axis and the angle of the output shafts can be adjusted, such that the drive system can be installed in different vehicle types using largely identical components.

14 Claims, 4 Drawing Sheets

DRIVE SYSTEM FOR THE INDIVIDUAL DRIVE OF BOTH DRIVEN WHEELS OF A DRIVEN WHEEL PAIR

This application is a national stage completion of PCT/EP2006/008218 filed Aug. 21, 2006, which claims priority from German Application Serial No. 10 2005 045 281.7 filed Sep. 22, 2005.

FIELD OF THE INVENTION

The invention concerns a drive system for individually driving the two driven wheels of a driven wheel pair or suchlike for a vehicle.

BACKGROUND OF THE INVENTION

For a long time, drive systems have been fitted into vehicles with slide steering, i.e., in vehicles, such that to drive around a curve the respective driven wheels (or sprocket wheels of a tracked vehicle) on the inside of the curve are slowed relative to the driven wheels on the outside of the curve. In this the continuously variable drive motors allow a largely free choice of the speed ratio between the driven wheel on the inside of the curve and the driven wheel on the outside of the curve. It has been shown, however, that when a transmission arrangement with a fixed transmission ratio is connected downstream from continuously variable drive motors, the latter comes up against their limits so far as final speed and drive torque are concerned. A further disadvantage is considered to be that for reasons of available space, it is often difficult to fit next to one another two drive aggregates arranged out of alignment with one another. Each consists of a drive motor, transmission arrangement and wheel in the direction of the rotation axis of the driven wheel pair and to design a driven axle arrangement for them.

From the unpublished DE 10 2005 010 514A, a drive system for individually driving two driven wheels of a driven wheel pair or the like for a vehicle is known. The drive system comprises two continuously variable drive machines each of which is in drive connection, via a transmission arrangement, with an associated driven wheel or the like. The transmission arrangement comprises two respective transmission units arranged one behind the other. One of the transmission units being designed as a shift transmission and the other transmission unit as a bevel gear transmission with a fixed ratio.

This drive train solves both of the technical problems outlined in that for each driven wheel two transmission units are used. One of the transmission units is designed to enable the transmission ratio to be changed and the other transmission unit to improve the installation circumstances. With the help of a two-stage shift transmission, two-speed or drive torque ranges can be preselected, while the bevel gear transmission makes it possible to arrange the drive machines and, if necessary, one of the two transmission units perpendicular to the rotational axis of the driven wheels.

The respective shift transmission of the transmission units is made as a two-stage planetary gearset in which the sun gear wheel is connected to a drive input shaft and the planetary gear carrier to a drive output shaft. A ring gear wheel of this planetary transmission can optionally be locked in a rotationally fixed manner or coupled to the drive output shaft. In addition, the shift transmission is arranged downstream from the drive machine and the bevel gear transmission downstream from that transmission.

Although this drive system is advantageous, nevertheless, it is desirable to further develop such a drive system in such a manner that it can be used without major structural modifications for different types of vehicles, with structural space situations and distances of the drive aggregates above the road that deviate from one another.

Against this background, the purpose of the invention is to provide a drive system of the type just outlined, which enables the final speed or drive torque to be varied and which is easier to fit into a vehicle. In addition, the drive system should be designed such that it can be used in different vehicle types, fitting space situations and distances of the drive aggregates above the ground, with only slight structural alterations using most of the same drive system components.

SUMMARY OF THE INVENTION

The invention is based on recognition of the objectives can be realized by relatively simple constructive measures by distributing the above mentioned, part objectives on which the invention is based between two transmission units; one of these transmission units is designed to enable variation of the transmission ratio while the other is designed to improve the installation requirements. Almost universal utility in different vehicle types is achieved by designing the transmission units in a particular manner.

Accordingly, the starting point of the invention is a drive system for individually driving two driven wheels of a driven wheel pair or the like for a vehicle comprising two continuously variable drive motors each of which is drivingly connected, via a transmission arrangement, with an associated driven wheel or the like.

To achieve the stated objectives starting from a drive system of that type, a respective transmission arrangement is provided comprising two transmission units; one of these being a shift transmission and the other transmission unit being bevel gear transmission comprising a spur gearset and a bevel gearset.

The shift transmission allows the transmission drive ratio to be varied, while the bevel gear transmission enables the drive shafts of the drive motors to be transversely arranged with respect to the rotational axis of the driven wheels. In each case, the spur gearset in each case makes it possible to position the drive shafts of the respective transmission units higher or lower, depending on the type of vehicle. In addition, varying the arrangement of the bevel gears of the bevel gear transmission, relative to one another, enables constructively easy adjustment of the inclination of the respective drive motor and shift transmission, relative to the longitudinal axis of the vehicle, in relation to a horizontal plane and of the drive output angle of the output shafts of the transmission units so that this drive system can be used with a largely identical component configuration for different vehicle types.

Thus, with the aid of a multi-stage shift transmission, several speed or drive torque ranges can be preselected, while the bevel gear transmission enables the drive motor and, if necessary, one of the two transmission units to be arranged perpendicularly to the rotation axis of the driven wheels, which considerably improves the fitting possibilities as will be illustrated with reference to example embodiments. In combination with the bevel gear stage, the spur gear stage on the drive output side then enables the spatial orientation of the transmission output to be adjusted within a wide range and the geometrical orientation of the drive motors and the transmissions transverse to the vehicle's longitudinal axis also to be varied.

In a preferred design of a drive system, according to the invention, the shift transmission is a two-stage, planetary gearset whose sun gear wheel is connected to a drive input shaft, whose planetary gear carrier is drivingly connected with a drive output shaft and whose ring gear wheel can optionally be locked in a rotationally fixed manner or coupled to the drive output shaft.

Planetary gearsets allow relatively large transmission ratios while being of a compact structure. A shift enables a large transmission ratio changes, again with little structural complexity by way of the ring gear wheel which can optionally be locked or coupled to the drive output shaft and, therefore, to the planetary gear carrier in fixed connection with it.

According to a further feature of a drive system, according to the invention, the shift transmission of each transmission unit is arranged downstream from the drive motor and the bevel gear transmission is arranged downstream from the shift transmission.

In a first embodiment of the drive system, the drive motors are arranged one behind the other, in the direction of the vehicle's longitudinal axis. The bevel gearset of the bevel gear transmission has a first bevel gear, which is connected in a rotationally fixed manner with the output shaft of the shift transmission and which meshes with a second bevel gear, while the second bevel gear is connected in a rotationally fixed manner or is integral with a first spur gear which meshes with a second spur gear. The latter is connected in a rotationally fixed manner to the output shaft of the respective transmission arrangement.

In a second embodiment of the drive system, the spur gearset of the bevel gear transmission comprises a first spur gear which is connected in a rotationally fixed manner to the drive output shaft of the shift transmission and which meshes with a second spur gear. This second spur gear is connected in a rotationally fixed manner or is integral with a first bevel gear, which meshes with a second bevel gear connected in a rotationally fixed manner to the output shaft of the respective transmission arrangement.

In a further embodiment of the drive system, the drive shafts of the two drive motors are arranged substantially perpendicular to the rotational axis of the driven wheel pair and the orientations of the respective bevel gear transmissions can be varied essentially by 90 degrees.

Another further embodiment provides that the output shaft of at least one shift transmission and the drive shaft of the associated drive motor are orientated to be at an angle to the vehicle's longitudinal axis in relation to a horizontal plane, whereby the ground clearance of these drive aggregates can be made larger.

The drive system is axially shorter if the output shaft of at least one shift transmission and the drive shaft of the associated drive motor are perpendicularly orientated to the longitudinal axis of the vehicle. Further axial shortening and a reduction of the width of the drive system can be achieved if the output drive shafts of the drive aggregates are also arranged perpendicular to the transverse axis of the vehicle.

Another further embodiment provides that the rotational axis of the combined bevel and spur gear lies in a horizontal plane different than that of the rotational axis of the output shaft of the respective transmission arrangement. This embodiment enables the drive output of the transmission arrangement to be located in the vehicle comparatively low, down toward the road so that when the driven wheels of the vehicle are driven by way of synchronous articulated shafts, the maximum deflection angle of the latter can be used to realize particularly large spring deflections.

In accordance with a further embodiment in relation to the longitudinal axis of the vehicle, the drive motors and the transmissions are arranged essentially one behind another or essentially next to one another. In the first such embodiment, the drive system is comparatively narrow and long in the vehicle's longitudinal direction whereas, according to the second embodiment, the drive system can be made comparatively short, but wider.

Preferably, the drive motors are arranged above the rotational axis of the output shafts of the transmission arrangement in order to obtain optimum ground clearance.

In another embodiment of the invention, the drive shafts of the drive motors are, in each case, arranged perpendicular to the rotational axis of the driven wheel pair and the respective bevel gear transmission has a deflection angle essentially of 90 degrees. In this way, the drive motors can be arranged along the vehicle's longitudinal axis ahead of and behind the rotation axis of the driven wheel pair so that the transmission arrangements are positioned, facing one another, close to the vehicle's longitudinal axis and can be connected by way of relatively long articulated shafts to driven wheels with individual spring suspensions.

The drive motors are preferably electric motors whose speed can be regulated in a simple manner.

Finally, the drive system, according to the invention, is preferably used in vehicles in which the driven wheels have individual spring suspensions. The wheels are connected by articulated shafts to the associated drive motors or the transmission units arranged downstream from the latter.

BRIEF DESCRIPTION OF THE DRAWINGS

The invention will now be described, by way of example, with reference to the accompanying drawings in which.

DETAILED DESCRIPTION OF THE INVENTION

Figure 1:
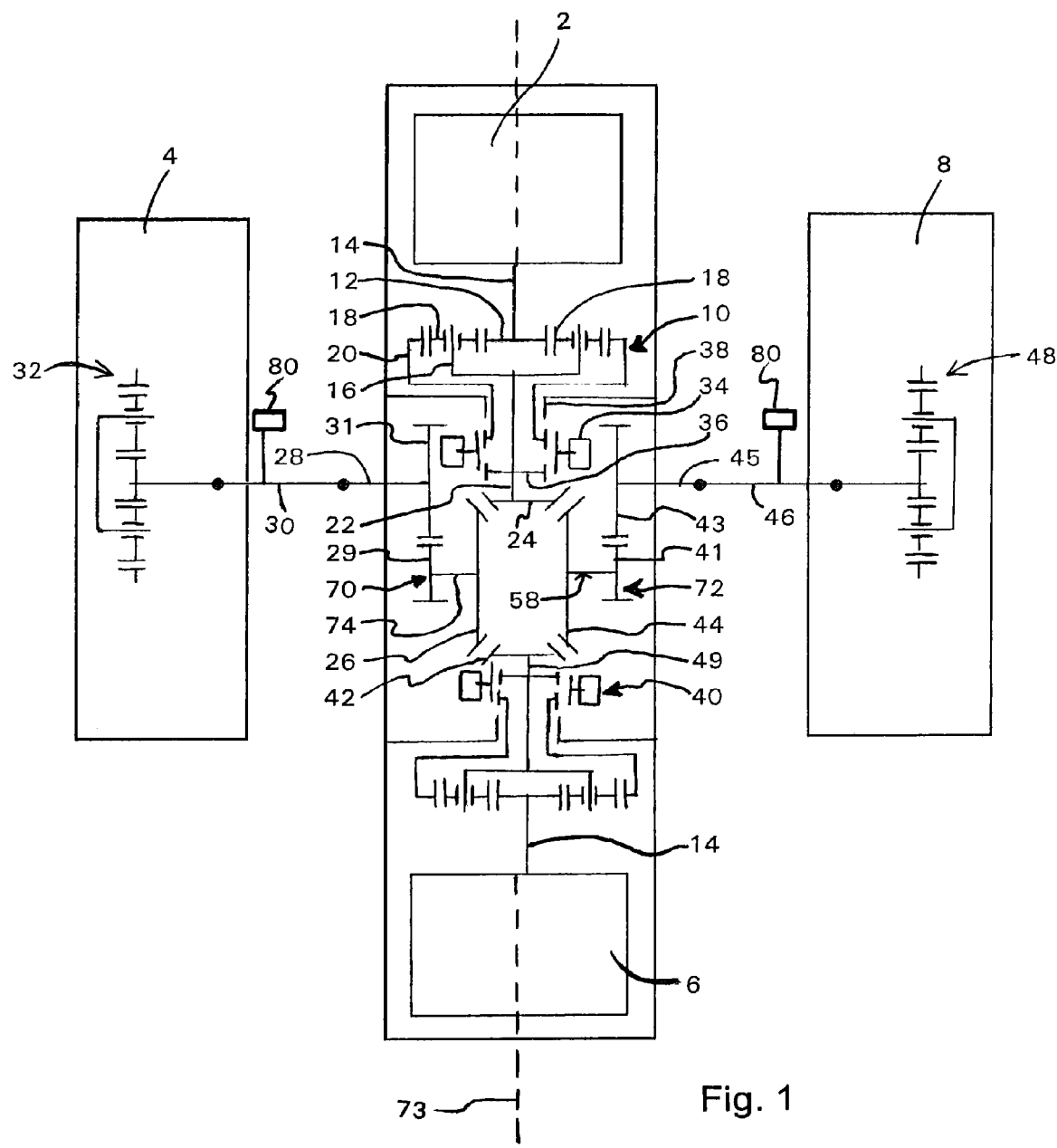
FIG. 1 is a drive system with the drive aggregates arranged in the longitudinal direction of the vehicle in which a respective shift transmission and a bevel gear transmission with a spur gear stage are arranged downstream from each drive motor.

The drive system, shown in FIG. 1, comprises a first drive motor 2 associated with a first driven wheel 4 and a second drive motor 6 associated with a second driven wheel 8. Arranged downstream from the first drive motor 2 is a two-stage, shift transmission 10 in the form of a planetary gearset. The sun gear 12 of the transmission 10 is connected with a drive input shaft 14 of the drive motor 2 and is engaged with several planetary gears 18 arranged on a planetary gear carrier 16; these being engaged on the other side with the inner teeth of a ring gear wheel 20.

The two drive motors 2, 6 and the respective transmissions arranged after them are arranged essentially one behind the other in a horizontal plane in a vehicle (not illustrated further). The plane also contains the longitudinal axis 73 of the vehicle.

The planetary gear carrier 16 is connected to a drive output shaft 22 which carries a bevel gear 24 at its free end that is engaged with a bevel gear 26. According to the invention, this latter bevel gear 26 is connected in a rotationally fixed manner or is integral with a spur gear 29, which is connected to a spur gear 31 at the transmission end of an output shaft 28 of the transmission arrangement. This output shaft 28 is drivingly connected with the first driven wheel 4 via an articulated shaft 30.

The articulated shaft 30, 46 enables a spring-loaded suspension 80, 81 of the driven wheel 4, 8 in a manner generally known and is not explained further. The driven wheel 4 is driven by the articulated shaft 30, via an additional planetary gearset 32, also as known in itself and, therefore, not explained again here.

The transmission 10 is made as a two-stage shift transmission. For that purpose, the ring gear 20 can optionally be coupled, via a shift pinion 34, either with a shift gear wheel 36 which is fixed on the drive shaft 22, as shown in FIG. 1, or with an array of locking teeth 38 fixedly arranged in the transmission housing. In the shift position, shown in FIG. 1, the planetary gear carrier 16 and the ring gear wheel 20 are coupled in a rotationally fixed manner with one another. Thus, the planetary gears 18 do not rotate relative to the ring gear 20, nor relative to the sun gear 12 either so that the drive output shaft 22 rotates at the same speed as the drive input shaft 14.

When the ring gear 20 is coupled by the shift pinion 34 to the locking teeth 38, the ring gear 20 is locked, relative to the housing, and the planetary gears 18 rotate on the inner teeth of the ring gear 20 so that the speed of the drive input shaft 14 is converted, in a known way, into a speed of the drive output shaft 22 that is different from it.

The drive system associated with the second driven wheel 8 is made in the same way as the drive system for the driven wheel 4, described above. It comprises a two-stage shift transmission 40 made as a planetary gearset, arranged downstream from the second drive motor 6 with a drive output shaft 49, a bevel gear transmission formed of bevel gears 42 and 44, a spur gear stage 41 on the bevel gear 44 and, meshing with the last-mentioned spur gear stage 41, a spur gear 43 rotationally attached in a fixed manner onto an output shaft 45 of the second transmission arrangement. This output shaft 45 is in active driving connection with an articulated shaft 46 such that a further planetary gearset 48, associated with the second driven wheel 8, can be driven.

The two driven wheels 4 and 8 are driven independently of one another by their respective associated drive motors 2 and 6. No power transfer takes place from one side to the other. Accordingly, the speed or drive torque regulation in the vehicle takes place by way of the shift transmissions 10, 40.

To begin driving round a curve, the speed of one of the two driven wheels 4 and/or 8 is slowed or accelerated by correspondingly regulating the associated drive motor 2, 6 so that the vehicle drives in a curved path as a result of the different speeds of the driven wheels.

Figure 3:
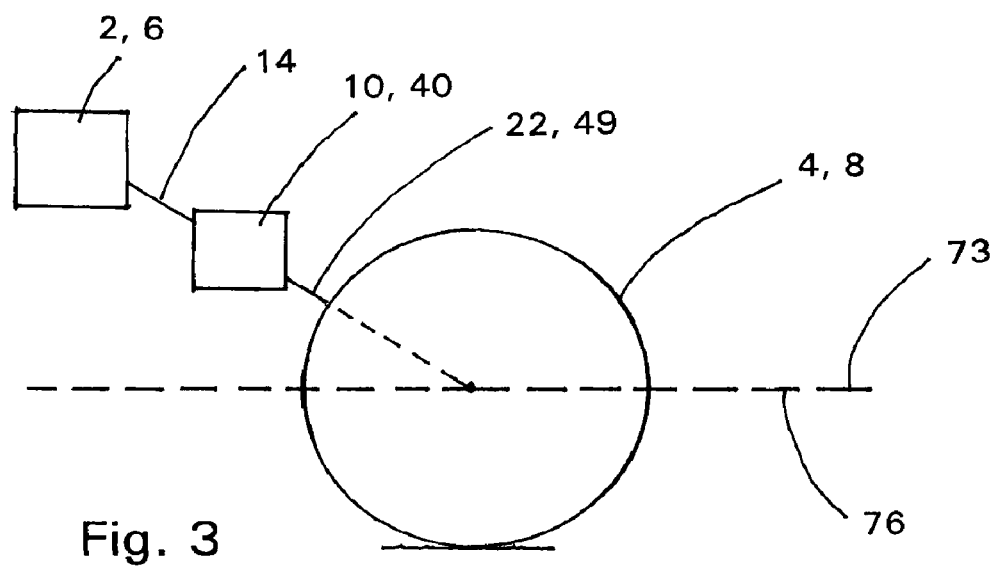
FIG. 3 is a schematic side view of a drive system from a point of view normal to the longitudinal direction of the vehicle.

As FIGS. 1 and 3 make clear in relation to the co-operation of the gears of the two transmission arrangements, the respective drive motors 2, 6 and their associated transmissions 10, 40 can be adjusted through an angle, so to speak out of the plane of the paper in FIG. 1, relative to a horizontal plane 76 containing the longitudinal axis 73 of the vehicle as seen in FIG. 3, since the point of engagement, between the respective bevel gear 24, 42 of the shift transmission 10, 40 connected with the output shaft 22, 49 and the associated bevel gear 26, 44 of a bevel gear transmission 70, 72, can be varied. For this purpose, the engagement point of the respective gears 24 and 26 or 42 and 44 is designed in such manner that the engagement point adopts the position desired on the gear teeth about the circumference of the bevel gear 26 and 44, respectively, as appropriate for the type of vehicle in question. This measure makes it possible to increase the ground clearance of the drive motors, when designing the drive system.

Insofar as the drive input shaft 14 of the respective drive motor 2, 6 and the drive output shaft 22, 49 of the respective shift transmission 10, 40 have a fixed orientation in the horizontal plane substantially along the longitudinal axis 73 of the vehicle, in accordance with another embodiment, the drive output angle of the output shafts 28 and 45 of the two transmission arrangements can be adjusted during construction by the aforesaid adjustment of the point of engagement. Preferably in doing this, the drive output angle is chosen such that the maximum possible deflection angle of an associated synchronous articulated shaft 30, 46 can be used in an optimum manner.

Finally, FIG. 1 discloses that, in this drive system, even the location of the output shafts 28 and 45 of the transmission arrangements can be modified in a manner specific for the type of vehicle. This can be done because the engagement point of the respective spur gear 31, 43 of the respective drive output shaft 28, 45 with the associated spur gear 29, 41 of the bevel gear transmission 70, 72 can be varied. Accordingly, this design measure enables the rotational axes of the two output shafts 28 and 45 of the transmission units to be raised or lowered relative to the road and to the rotational axes of the combined bevel and spur gears 26, 29 and 41, 44, respectively.

Figure 2:
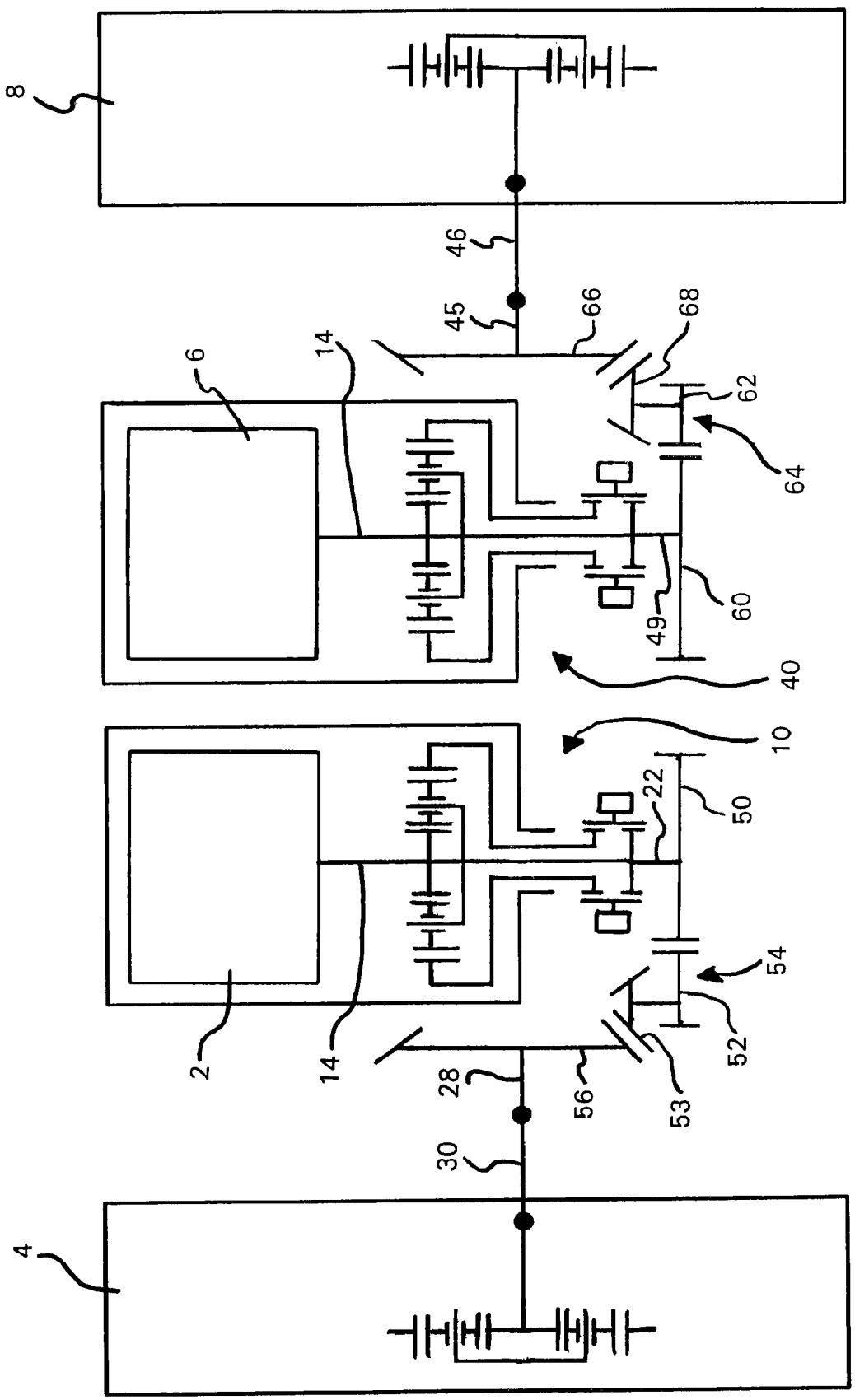
FIG. 2 is a drive system, as in FIG. 1, but with the drive aggregates in a vertical arrangement

FIG. 2 shows a drive system, similar to FIG. 1, but is represented as viewed in the vehicle's longitudinal direction 73. In contrast to the embodiment, according to FIG. 1, the two drive motors 2, 6 and the shift transmissions 10, 40 are fitted vertically in the vehicle instead of horizontally as in FIG. 1. Consequently, the output shafts 22 and 49 of the transmission arrangements are essentially perpendicular to the road. In the case of such a vertical arrangement of the drive aggregates, depending on the structural space situation in the vehicle concerned, they can be arranged, in relation to the longitudinal direction of the vehicle, either axially one behind the other or, as shown in FIG. 2, next to one another in the vehicle.

As is also clear from FIG. 2, the two shift transmissions 10 and 40 have on their output side respective spur gears 50 and 60, which are connected in a rotational fixed manner to the associated output shafts 22, 49 of the transmission. These spur gears 50, 60 respectively mesh with associated spur gears 52 and 62 of bevel gear transmissions 54 and 64 with a fixed transmission ratio. The spur gears 52 and 62 are connected in a rotationally fixed manner or are integral with respective bevel gears 53 and 68. The bevel gears 53 and 68 mesh, respectively, with an associated other bevel gear 56 and 66, each of these latter being coupled in a rotationally fixed manner to one or the other of the output shafts 28 and 45. From there, the torque is passed onto the two driven wheels 4 and 8 by way of associated articulated shafts 30 and 46, respectively, in the manner described earlier.

From FIG. 2, it can also be seen that a design variation of the respective engagement point of the spur gear 50, 60 of the shift transmission 10, 40 in the associated spur gear 52 and 62 of the respective bevel gear transmission 54 and 56, allows adjustment of the mounting location of the combination consisting of the drive motor 2, 6 and shift transmission 10, 40, by swiveling around the perpendicular rotation axis of the respective spur gear 52, 62 of the bevel gear transmission 54, 64 in a horizontal plane of the vehicle. This, as shown in FIG. 2, enables the combinations of the drive motors 2, 6 and the shift transmissions 10, 40 to be arranged in a horizontal plane transverse to the vehicle's longitudinal axis 73, either next to one another or longitudinally one behind the other.

Figure 4:
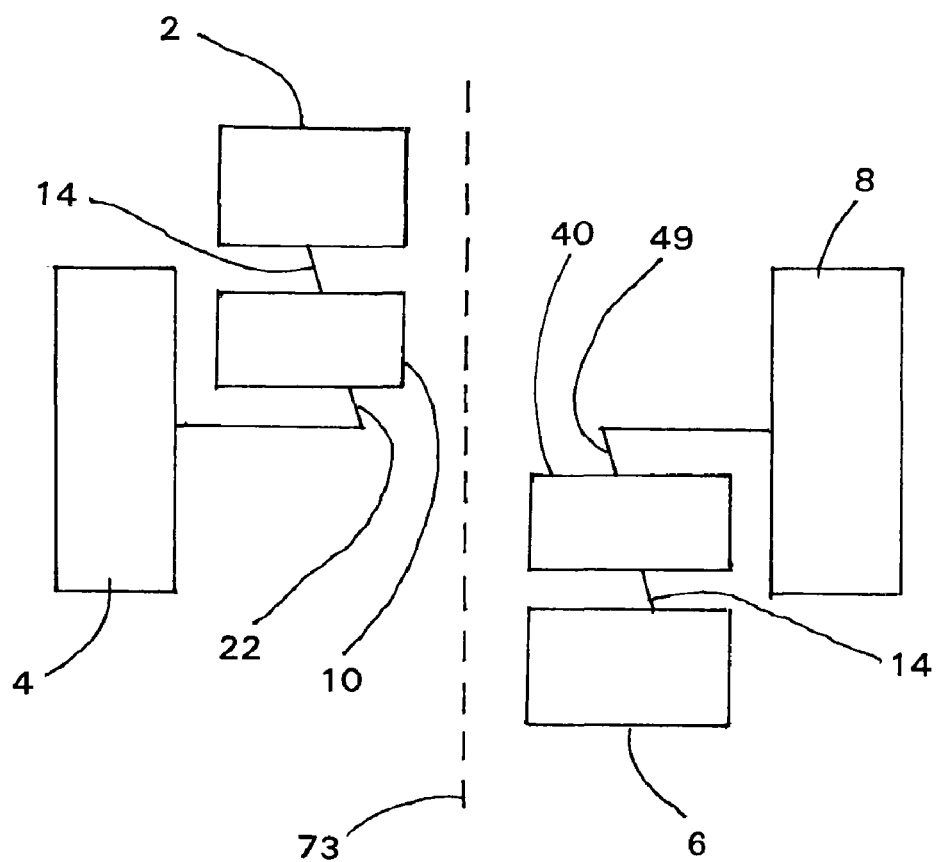
FIG. 4 is a schematic top view of a drive system from a point of view normal to the longitudinal direction of the vehicle.
Figure 6:
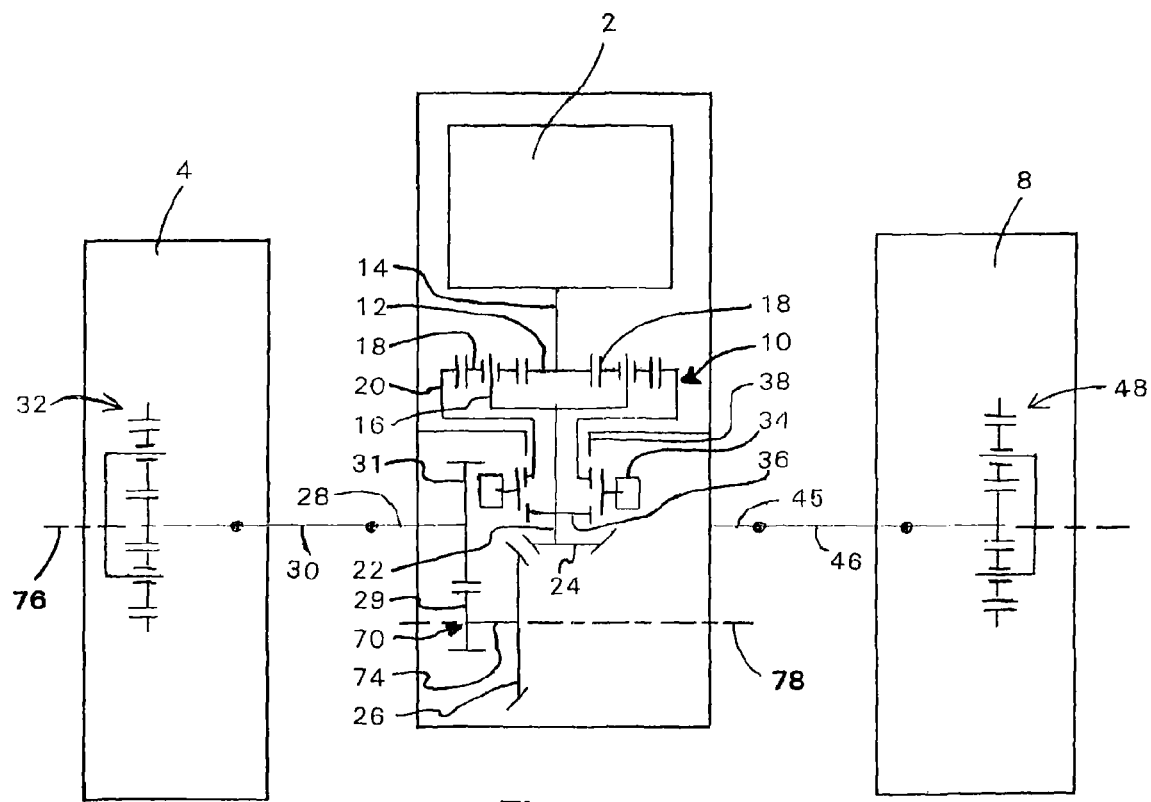
FIG. 6 is a view of a portion of the drive system from a point of view along the longitudinal direction of the vehicle.
Figure 5:
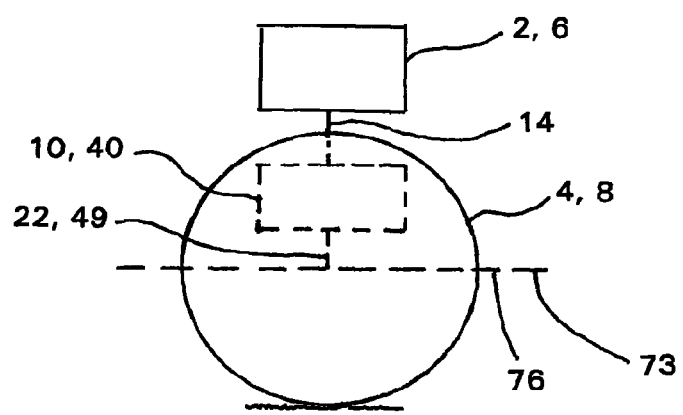
FIG. 5 is another schematic side view of a drive system from a point of view normal to the longitudinal direction of the vehicle.

Finally, FIG. 2 shows that in this vertical arrangement of the combination consisting of drive motor 2, 6 and shift transmission 10, 40, their drive input shafts 14 and drive output shafts 22, 49 can be arranged in a vehicle at an angle which, in relation to the horizontal plane 76, is not perpendicular to the longitudinal axis 73 of the vehicle. For this, the engagement point of the respective gears 53 and 56 and 66 and 68 is constructively varied in such a manner that the point adopts the position desired, for the vehicle type concerned, on the gear teeth about the circumference of the bevel gear 56, 66 connected to the input shaft 28, 45. As shown in FIGS. 3 and 4, the output shaft 22, 49 of at least one shift transmission 10, 40 and the drive input shaft 14 of the associated drive motor 2, 6 are orientated at an inclination to the longitudinal axis 73 of the vehicle and to a horizontal plane 76. As shown in FIG. 5, the output shaft 22, 49 of at least one shift transmission 10, 40 and the drive input shaft 14 of the associated drive motor 2, 6 are orientated perpendicularly to the vehicle's longitudinal axis 73 and to the horizontal plane 76. The rotation axis 58, 74 of the combined bevel and spur gear 26, 29; 41, 44, as shown in FIG. 6 lies in a horizontal plane 78 different from that of the rotational axis 82 of the output shaft 28, 45 of the respective transmission arrangement.

REFERENCE NUMERALS 2, 2' first drive motor
4 driven wheel
6, 6' second drive motor
8 second driven wheel
10 shift transmission
12 sun gear
14 drive input shaft
16 planetary gear carrier
18 planetary gears
20 ring gear
22 drive output shaft
24 bevel gear
26 bevel gear
28 output shaft of the respective transmission arrangement
29 spur gear stage, spur gear on the bevel gear 26
30 articulated shaft
31 spur gear on the output shaft 28
32 planetary gearset
34 shift pinion
36 shift gear wheel
38 locking teeth
40 shift transmission
41 spur gear stage, spur gear on the bevel gear 44
42 bevel gear
43 spur gear on the output shaft 45
44 bevel gear
45 output shaft of the respective transmission arrangement
46 articulated shaft
48 planetary gearset
49 drive output shaft
50 spur gear
52 spur gear
53 bevel gear
54 bevel gear transmission
56 bevel gear
58 rotation axis of the combined bevel and spur gear 41, 44
60 spur gear
62 spur gear
64 bevel gear transmission
66 bevel gear
68 bevel gear
70 bevel gear transmission
72 bevel gear transmission
73 longitudinal axis of the vehicle
74 rotation axis of the combined bevel and spur gear 26, 29

The invention claimed is:

1. A drive system for individually driving two driven wheels of a driven wheel pair of a vehicle, the drive system comprises two continuously variable drive motors (2, 6) each of which is drivingly connected with a driven wheel (4, 8) via a respective transmission arrangement, which comprises a shift transmission (10, 40) and a bevel gear transmission (54, 64; 70, 72), the bevel gear transmission (54, 64; 70, 72) has a fixed transmission ratio and includes a spur gearset and a bevel gearset, an output shaft (22, 49) of the at least one shift transmission (10, 40) and a drive input shaft (14) of the drive motor (2, 6), which is associated with the at least one shift transmission (10, 40), are inclined with respect to a longitudinal axis of the vehicle and a horizontal plane.

2. The drive system according to claim 1, wherein the shift transmission (10, 40) of each of the respective transmission arrangements is a two-stage planetary gearset which comprises a sun gear (12) which is connected to a drive input shaft (14), a planetary gear carrier (16) which is connected to a drive output shaft (22), and a ring gear (20) which is one of rotationally fixed and coupled to the drive output shaft (22).

3. The drive system according to claim 1, wherein the shift transmission (10, 40) of each of the respective transmission arrangements is arranged downstream from the drive motor (2, 6) and the bevel gear transmission (54, 64; 70, 72) is arranged downstream from the shift transmission (10, 40).

4. The drive system according to claim 1, wherein each of the bevel gearsets of the bevel gear transmissions (70, 72) comprises a first bevel gear (24, 42), which is rotationally fixed to a drive output shaft (22, 49) of the shift transmission (10, 40) and engages a second bevel gear (26, 44) which is one of rotationally fixed to and integral with a first spur gear (29, 41) that engages a second spur gear (31, 43) which is rotationally fixed to an output shaft (28, 45) of the respective transmission arrangement.

5. The drive system according to claim 1, wherein each of the bevel gearsets of the bevel gear transmissions (70, 72) comprises a first spur gear (50, 60), which is rotationally fixed to a drive output shaft (22, 49) of the shift transmission (10, 40) and engages a second spur gear (52, 62), which is one of rotationally fixed to and integral with a first bevel gear (53, 68) that engages a second bevel gear (56, 66), which is rotationally fixed to an output shaft (28, 45) of the respective transmission arrangement.

6. The drive system according to claim 1, wherein drive input shafts (14) of the two drive motors (2, 6) are aligned substantially perpendicular to a rotation axis of the driven wheel pair (4, 8) and each of the bevel gear transmissions (54, 64; 70, 72) has a deflection angle of 90 degrees.

7. The drive system according to claim 1, wherein the output shaft (22, 49) of the at least one shift transmission (10, 40) and the drive input shaft (14) of the drive motor (2, 6), which is associated with the at least one shift transmission (10, 40), extend perpendicular to the longitudinal axis of the vehicle and the horizontal plane.

8. The drive system according to claim 1, wherein a rotational axis (58, 74) of a combined bevel gear and spur gear (26, 29; 41, 44) is in a first horizontal plane (78) and a rotational axis of an output shaft (28, 45) of the respective transmission arrangement is in a second horizontal plane (76).

9. The drive system according to claim 1, wherein, with respect to a longitudinal axis of the vehicle, a first of the two drive motors (2) and a first of the transmission arrangements (10, 40) are arranged essentially behind a second of the two drive motors (6) and a second of the transmission arrangements (54, 64).

10. The drive system according to claim 1, wherein the drive motors (2, 6) are electric motors.

11. The drive system according to claim 1, wherein each of the driven wheels (4, 8) has an individual spring suspension and is connected by an articulated shaft (30, 46) to the associated drive motor (2, 6) and the respective transmission arrangement which is arranged downstream therefrom.

12. The drive system according to claim 1, wherein, with respect to a longitudinal axis of the vehicle, a first of the two drive motors (2) and a first of the transmission arrangements (10, 40) are arranged essentially beside a second of the two drive motors (6) and a second of the transmission arrangements (54, 64).

13. A drive system for individually driving two driven wheels of a driven wheel pair of a vehicle, the drive system comprises two continuously variable drive motors (2, 6) each of which is drivinaly connected with a driven wheel (4, 8) via a respective transmission arrangement, which comprises a shift transmission (10, 40) and a bevel gear transmission (54, 64; 70, 72), the bevel gear transmission (54, 64; 70, 72) has a fixed transmission ratio and includes a spur gearset and a bevel gearset and each of the drive motors (2, 6) is arranged above a rotational axis of an output shaft (28, 45) of the respective transmission arrangement.

14. A drive system of a vehicle for individually driving driven wheels of a driven wheel pair, the drive system comprising:

a continuously variable first drive motor (2) for providing drive to a first driven wheel (4) of the driven wheel pair (4, 8);

a first transmission arrangement being coupled to the first drive motor (2) and the first driven wheel (4) transmits drive from the first drive motor (2), the first transmission arrangement including a first shift transmission (10) and a downstream first bevel gear transmission (54, 70), and the first drive motor (2) engaging the first shift transmission (10), which engages the first bevel gear transmission (54, 64);

a continuously variable second drive motor (6) for providing drive to a second driven wheel (8) of the driven wheel pair (4, 8);

a second transmission arrangement being coupled to the second drive motor (6) and the second driven wheel (8) transmits drive from the second drive motor (6), the second transmission arrangement including a second shift transmission (40) and a downstream second bevel gear transmission (64, 72), the second drive motor (6) engages the second shift transmission (40), which engages the second bevel gear transmission (64, 72);

each of the first shift transmission (10) and the second shift transmission (40) is a two stage planetary gearset comprising a ring gear (20), a planet carrier (16) and a sun gear (12), which is coupled to the respective first drive motor (2) or the second drive motor (6) by an input shaft (14);

each of the first bevel gear transmission (54, 70) and the second bevel gear transmission (70, 72) having a fixed transmission ratio and comprises a spur gearset and a bevel gearset and being driven by one of the ring gear (20) and the planet carrier (16) of the respective first shift transmission (10) or the second shift transmission (40); and an output shaft (22, 49) of the at least one of the first and the second shift transmissions (10, 40) and the input shaft (1) of the first or the second drive motor (2, 6), which is associated with the at least one of the first and the second shift transmission (10, 40), are inclined with respect to at least one of a longitudinal axis of the vehicle and a horizontal plane.

\* \* \* \* \*